(12) United States Patent
Carter

(10) Patent No.: US 8,469,422 B2
(45) Date of Patent: Jun. 25, 2013

(54) WEED EXTRACTION SYSTEM, METHOD

(76) Inventor: Larry Carter, Makawao, HI (US)

(*) Notice: Subject to any disclaimer, the term of this patent is extended or adjusted under 35 U.S.C. 154(b) by 0 days.

(21) Appl. No.: 12/793,303

(22) Filed: Jun. 3, 2010

(65) Prior Publication Data

US 2011/0298233 A1    Dec. 8, 2011

(51) Int. Cl.
*A01B 1/18*    (2006.01)
(52) U.S. Cl.
USPC ............................ 294/118; 294/50.8; 294/902
(58) Field of Classification Search
USPC ................... 294/8.5, 11, 16, 118, 50.6, 50.8, 294/902
See application file for complete search history.

(56) References Cited

U.S. PATENT DOCUMENTS

| | | | | | |
|---|---|---|---|---|---|
| 97,399 | A | * | 11/1869 | Holmes | 294/118 |
| 201,787 | A | * | 3/1878 | Hoover | 294/50.8 |
| 233,410 | A | * | 10/1880 | Hale | 30/134 |
| 969,695 | A | * | 9/1910 | Holsey | 294/118 |
| 1,708,382 | A | * | 4/1929 | Drummond | 294/50.8 |
| 2,229,434 | A | * | 1/1941 | Bailie | 294/50.8 |
| 2,239,108 | A | * | 4/1941 | Lindemann | 294/118 |
| 2,291,822 | A | * | 8/1942 | McSherry | 294/50.8 |
| 2,358,682 | A | * | 9/1944 | Benton et al. | 294/104 |
| 2,653,844 | A | * | 9/1953 | Detwiler | 294/118 |
| 3,964,775 | A | * | 6/1976 | Boyd | 294/16 |
| 4,073,533 | A | * | 2/1978 | De brey et al. | 294/118 |
| 4,389,065 | A | * | 6/1983 | Atkinson | 294/50.8 |
| 4,577,900 | A | * | 3/1986 | Chasen | 294/118 |
| 5,556,150 | A | * | 9/1996 | Ampel | 294/118 |
| 7,384,084 | B2 | * | 6/2008 | McIlrath | 294/50.8 |

* cited by examiner

*Primary Examiner* — Dean Kramer
(74) *Attorney, Agent, or Firm* — The Eclipse Group LLP

(57) ABSTRACT

A system and method for providing weed extraction so Industrial, Commercial and Home users (ICAHUs) can assure that unwanted weeds can be easily and effectively extracted. The system and method allows ICAHUs to work safely and efficiently and to extract weeds by using a hand-held device that can easily penetrate the ground around weeds, secure the unwanted weed, and aid the user in extracting the weed from the ground. ICAHUs can easily operate the levers of the device which operate jaws to secure to weeds. Specialized debris passages in the jaws of the device allow for debris to be passed through the jaws of the device which allow to for continued use and a greatly reduced need to clean the device during use. The method comprises a system in which unwanted weeds may be easily secured and extracted by the user without an increased risk of accidents or without unnecessary steps or procedures for cleaning.

8 Claims, 5 Drawing Sheets

WEED EXTRACTION SYSTEM, METHOD

FIELD OF THE INVENTION

The present invention is in the field of Industrial, Commercial and Home use, specifically a system and method to safely remove unwanted weeds. Said weeds may also include undesired plants. Said invention shall assure that said weeds are easily uprooted and extracted.

BACKGROUND OF THE INVENTION

Today, it is necessary for Industrial, Commercial and Home users (ICAHUs) of tools and systems, to work safely and efficiently. Often, weeds clutter garden areas and are an eyesore. Said weeds need to be extracted in order to provide an organized and clean landscape and to protect other plants that may be beneficial for the environment and pleasing to the eye. Removing unwanted weeds can pose a danger in that many gardening tools have sharp edges and are not always easy to use. There exists no easy to use, safe solution to the age-old problem of removing unwanted weeds. For this reason and others, this present invention, a weed extraction (WE) system and method will easily accommodate and facilitate that unwanted weeds are easily extracted by ICAHUs in a safe and efficient manner.

Heretofore, inventors have not created and developed a system and method for weed extraction that will fit easily in the hand of an ICAHU. This invention permits said ICAHUs to employ the WE system and method easily by fitting the WE device in hand, by opening said devices jaws, by inserting said jaws into the ground around a weed to be extracted, by closing said jaws, and by pulling upward or in an opposite direction from the weeds' root structure in order to extract said weed.

U.S. Pat. No. 6,016,876 (Rountree et al., 2000) expressly incorporated herein by reference, relates to a weed extractor. This existing art is specifically for extracting weeds yet with a focus on a shaft, foot piece, distal end and pivotally mounted opposed spikes and is entirely different in its scope and design from this present invention that is designed to allow a user to securely grip an unwanted weed by use of a hand-held tool and to thereby pull the weed and dislodge it from its rooted area.

U.S. Pat. No. 4,274,619 (Redmond, 1981) expressly incorporated herein by reference, relates to a weed extraction apparatus. This existing art is specifically for extracting weeds, yet with a focus on a hand-held device that employs use of a relatively large cylinder and is entirely different in its scope and design from this present invention that is designed to allow a user to securely grip an unwanted weed and to thereby pull the weed and dislodge it from its rooted area.

U.S. Pat. No. 5,042,778 (Szazy, 1991) expressly incorporated herein by reference, relates to a weed puller apparatus. This existing art is specifically for securing a v-shaped notch to a user's foot and is entirely different in its scope and design from this present invention that is designed to allow a user to securely grip an unwanted weed and to thereby pull the weed and dislodge it from its rooted area.

Accordingly, existing inventions describe methods and systems for attempting to extract and remove weeds, but there does not appear to be an invention that possesses all the features and components of our system and method for weed extraction as in this present invention. Moreover, none of the prior art has been commercialized due to its failure to perform its intended goal. To summarize, the systems and methods of the existing inventions have one or more of these disadvantages:

- Existing art is not easy-to-use and requires a complex set of moving parts and hardware that may fail.
- Existing art requires attaching itself to the foot of a user.
- Existing art employs use of spikes, springs and a control piece that are greatly limited in their ability to enter the ground and grip around the root structure of a weed.
- Existing art employs use of a cylinder that does not allow ability for a gripping surface to enter the ground and grip around the root structure of a weed.
- Existing art does not actually accurately grip a weed and its root structure with ease, and therefore fails in its true goal, rendering said prior art unworkable with no need for commercialization.
- Existing art does not adequately perform its intended goal with efficacy, and therefore requires the user to take extra steps which cost time and effort, or to discontinue use of prior art.

SUMMARY OF THE INVENTION

The present invention relates to a system and method for providing weed extraction so Industrial, Commercial and Home users (ICAHUs) can assure that unwanted weeds can be easily and effectively extracted. The system and method allows ICAHUs to work safely and efficiently and to extract weeds by using a hand-held device that can easily penetrate the ground around weeds, secure the unwanted weed, and aid the user in extracting the weed from the ground. Said invention is comprised by a series of levers and jaws which rotate on an axis in order to allow said jaws to open and close. ICAHUs can easily operate the levers of said device which operate said jaws to secure to weeds. Specialized debris passages in the jaws of the device allow for debris to be passed through the jaws of the device which allow to for continued use and a greatly reduced need to clean the device during use. The method comprises a system in which unwanted weeds may be easily secured and extracted by the user without an increased risk of accidents or without unnecessary steps or procedures for cleaning.

This present invention will be described further in preferred embodiments, and it overcomes all of the above-mentioned disadvantages of today's existing art. This invention extracts weeds easily and with accuracy and precision, and without the use of a complex series of mechanical parts which may break.

Broadly stated, this present invention is a weed extraction system and method that in its best mode form has: a first lever configured to be held by user of said device; a second lever configured to be held by user of said device; a general axis configured to allow said levers to rotate; a first jaw configured to rotate on said general axis; a second jaw configured to rotate on said general axis; a gripping surface on the interior edge of said jaws; and a lever grip to be held by said user of said device. In the present invention said jaws open around, and then subsequently close down on a weed, to secure said weed for extraction. Debris passages may be incorporated and allow for debris including but not limited to dirt, rocks, mud, water, plant material to move away from the gripping surface and either into, or into and then subsequently outside of said jaws. Said debris passages allow for debris to be naturally and automatically discarded during use, and thereby debris are moved away from the gripping surface that may contact the weed. This creates a self-cleaning which allows a user to use the device more easily without having to take unnecessary or additional steps while extracting weeds.

Accordingly, a feature and advantage of this present invention is its ability to allow a user to extract weeds quickly, efficiently and without wasting time or effort. In other terms, this present invention assures a novel and unobvious set of features that comprises a device that may be used with ease and efficacy without adding additional work to the already arduous process of extracting weeds.

Various aspects, features, sub-methods, and advantages of the present invention will become more apparent from the detailed description, taken with the accompanying drawing, of preferred embodiments of the invention, which is presented for example only.

DETAILED DESCRIPTION OF THE PREFERRED EMBODIMENTS

The preferred embodiment of the present invention will now be described in even greater detail by reference to the following figures.

Figure 1:
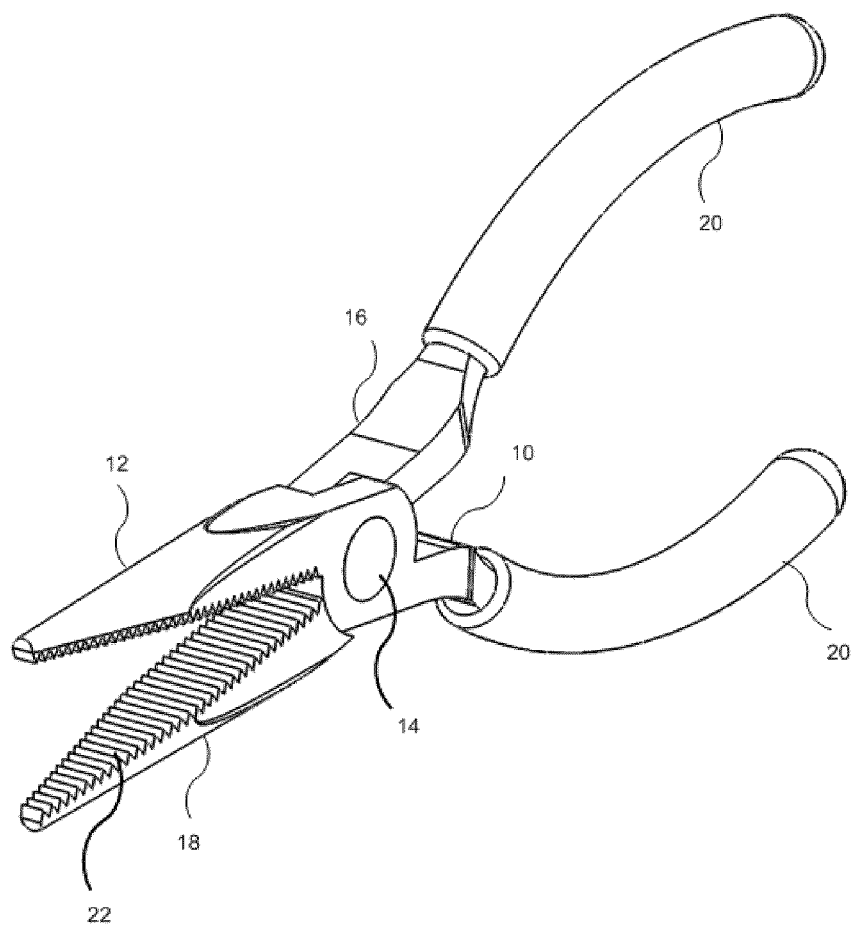
FIG. 1 is a drawing depicting the Weed Extraction (WE) System and Method of the preferred embodiment.

FIG. 1 depicts the overall "Best Mode" Weed Extraction (WE) system and method of the preferred embodiment which includes a first lever 10 configured to be held by user of said device; a second lever 16 configured to be held by user of said device; a general axis 14 configured to allow said levers 10 and 16 to rotate; a first jaw 12 configured to rotate on said general axis 14; a second jaw 18 configured to rotate on said general axis 14; a gripping surface 22 on the interior edge of said jaws 12 and 18; and a lever grip 20 to be held by said user of said device. In the present invention said jaws 12 and 18 open around, and then subsequently close down on a weed, to secure said weed for extraction. In this embodiment, the general axis 14 is combined with the second lever 16, and the first lever 10 rotates on the combined general axis 14 and second lever 16. The first jaw 12 and the second jaw 18 contain a gripping surface designed to secure a weed.

Figure 2:
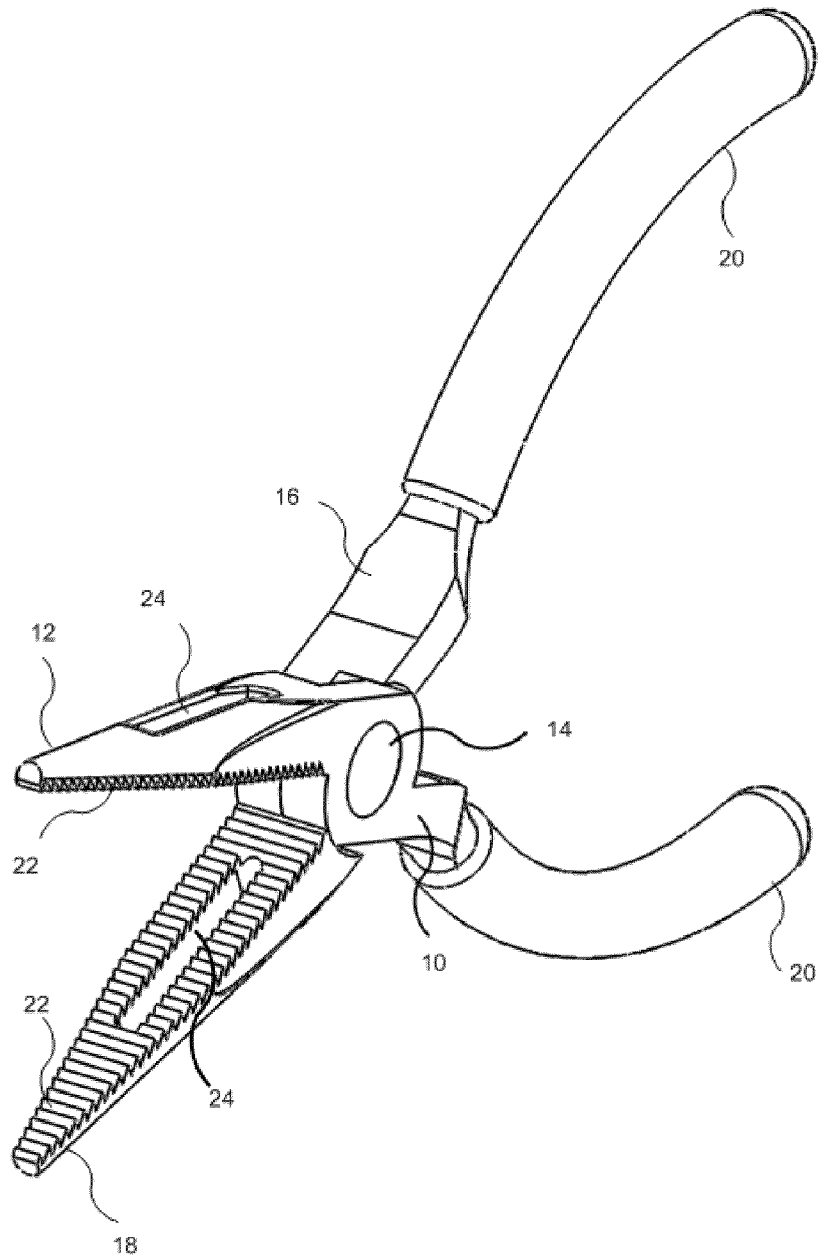
FIG. 2 is a drawing depicting a mode of the Weed Extraction (WE) System and Method, including debris passages, of the preferred embodiment.

FIG. 2 depicts the Weed Extraction (WE) system and method of the preferred embodiment which includes a debris passages 24, and a first lever 10 configured to be held by user of said device; a second lever 16 configured to be held by user of said device; a general axis 14 configured to allow said levers 10 and 16 to rotate; a first jaw 12 configured to rotate on said general axis 14; a second jaw 18 configured to rotate on said general axis 14; a gripping surface 22 on the interior edge of said jaws 12 and 18; and a lever grip 20 to be held by said user of said device. In the present invention said jaws 12 and 18 open around, and then subsequently close down on a weed, to secure said weed for extraction. In this embodiment, the general axis 14 is combined with the second lever 16, and the first lever 10 rotates on the combined general axis 14 and second lever 16. The first jaw 12 and the second jaw 18 contain a gripping surface designed to secure a weed. Said debris passages 24 allow for debris including but not limited to dirt, rocks, mud, water, plant material to move away from the gripping surface and either into, or into and then subsequently outside of said jaws 12 and 18. Said debris passages 24 allow for debris to be naturally and automatically discarded during use, and thereby moved away from the gripping surface 22 that will contact said weeds.

Figure 3:
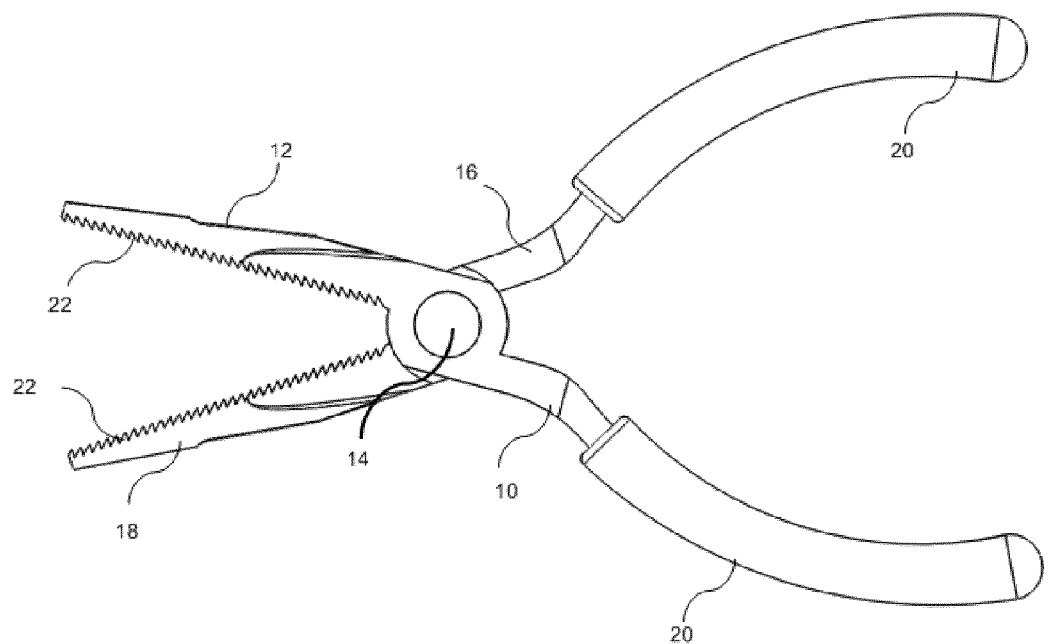
FIG. 3 is a drawing depicting the Weed Extraction (WE) System and Method, with a side view of gripping surfaces, of the preferred embodiment.

FIG. 3 depicts the Weed Extraction (WE) system and method from the side view of the preferred embodiment which includes a first lever 10 configured to be held by user of said device; a second lever 16 configured to be held by user of said device; a general axis 14 configured to allow said levers 10 and 16 to rotate; a first jaw 12 configured to rotate on said general axis 14; a second jaw 18 configured to rotate on said general axis 14; a gripping surface 22 on the interior edge of said jaws 12 and 18; and a lever grip 20 to be held by said user of said device. In the present invention said jaws 12 and 18 open around, and then subsequently close down on a weed, to secure said weed for extraction. In this embodiment, the general axis 14 is combined with the second lever 16, and the first lever 10 rotates on the combined general axis 14 and second lever 16. The first jaw 12 and the second jaw 18 contain a gripping surface 22 designed to secure a weed. Said gripping surfaces 22 indicate an angled series of notches that point back toward the general axis 14.

Figure 4:
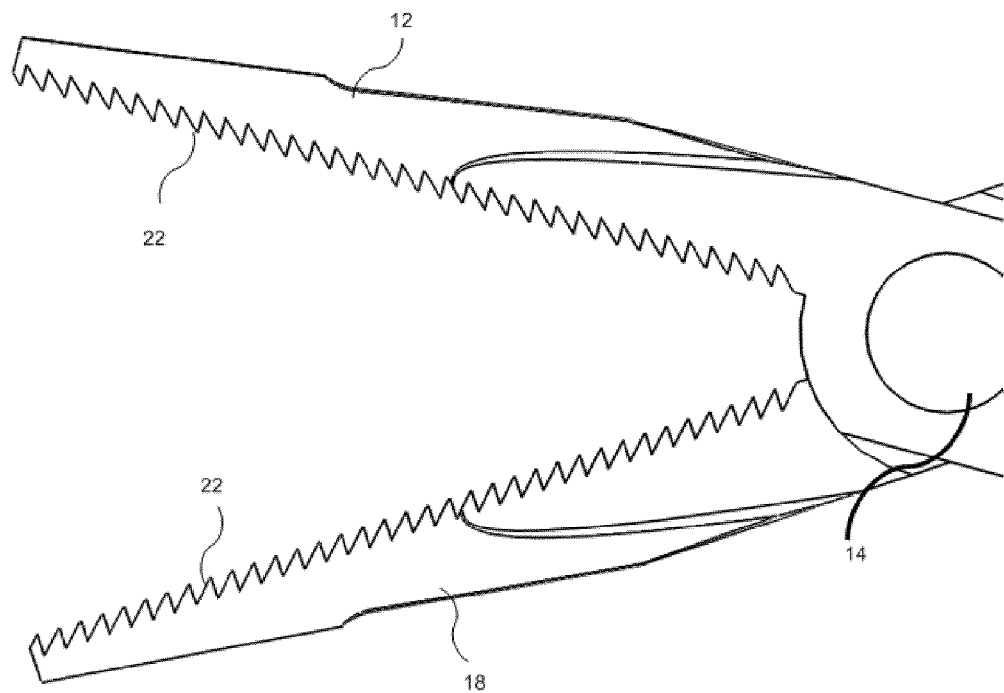
FIG. 4 is a drawing depicting the side view of gripping surfaces, of the preferred embodiment.

FIG. 4 depicts the enlarged side view of the preferred embodiment which includes a general axis 14; a first jaw 12 configured to rotate on said general axis 14; a second jaw 18 configured to rotate on said general axis 14; a gripping surface 22 on the interior edge of said jaws 12 and 18. In this embodiment, the first jaw 12 and the second jaw 18 contain a gripping surface 22 designed to secure a weed. Said gripping surfaces 22 indicate an angled series of notches that point back toward the general axis 14.

Figure 5:
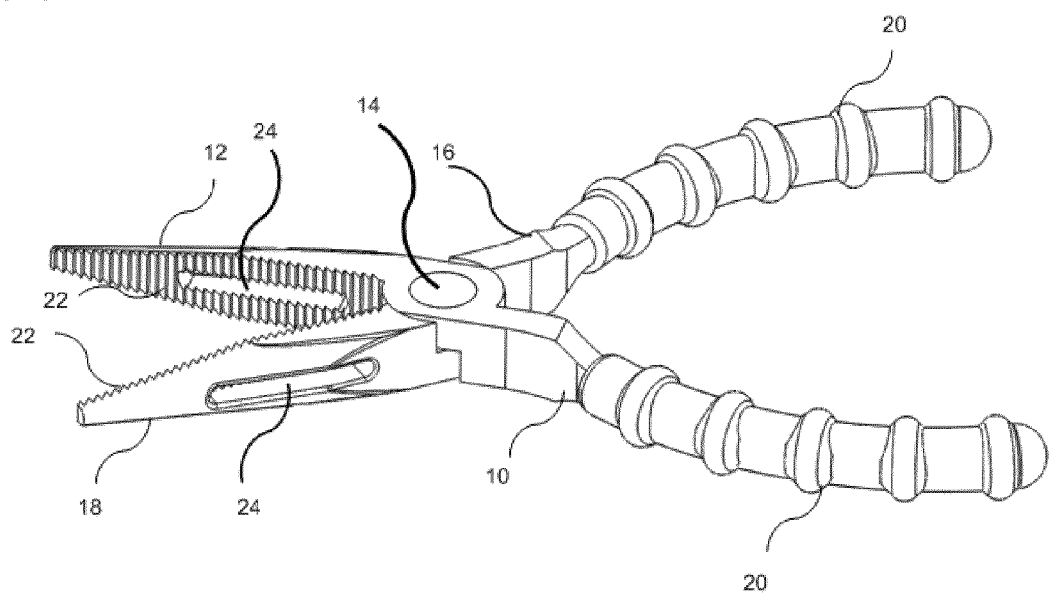
FIG. 5 is a drawing depicting the Weed Extraction (WE) System and Method, with a view of lever covers, of the preferred embodiment.

FIG. 5 depicts the Weed Extraction (WE) system and method of the preferred embodiment which includes a debris passages 24, and a first lever 10 configured to be held by user of said device; a second lever 16 configured to be held by user of said device; a general axis 14 configured to allow said levers 10 and 16 to rotate; a first jaw 12 configured to rotate on said general axis 14; a second jaw 18 configured to rotate on said general axis 14; a gripping surface 22 on the interior edge of said jaws 12 and 18; and a lever grip 20 to be held by said user of said device. In the present invention said jaws 12 and 18 open around, and then subsequently close down on a weed, to secure said weed for extraction. In this embodiment, the general axis 14 is combined with the second lever 16, and the first lever 10 rotates on the combined general axis 14 and second lever 16. The first jaw 12 and the second jaw 18 contain a gripping surface designed to secure a weed. Said debris passages 24 allow for debris including but not limited to dirt, rocks, mud, water, plant material to move away from the gripping surface and either into, or into and then subsequently outside of said jaws 12 and 18. Said debris passages 24 allow for debris to be naturally discarded during use, and thereby moved away from the weed that may contact the gripping surface. Said lever grips 20 are shown as having protrusions or raised and lowered areas in order to promote traction and grip between the hand of the user and said levers 10 and 16 during use.

What is claimed is:

1. A method of extracting a weed comprising:
   a. providing a weed extraction device, comprising:
      i) a first lever configured to be held by user of said device;

ii) a second lever configured to be held by user of said device;
iii) a general axis configured to allow said levers to rotate;
iv) a first jaw having a planar internal face and configured to rotate on said general axis;
v) a second jaw having a planar internal face and configured to rotate on said general axis;
vi) a jagged gripping surface formed on and extending across the entire interior face of said jaws;
vii) a lever grip to be held by said user of said device;
wherein said jaws can be rotated on said general axis away from each other, or toward each other, and wherein at least one jaw contains one or more debris passage extending through a central portion of the gripping surface where said debris passage passes debris away from the gripping surface;
b. rotating said jaws away from each other;
c. placing said jaws on each side of a weed for extraction;
d. rotating said jaws toward each other to secure weed; and
e. pulling said weed out of ground or other substance, thereby extracting said weed.

2. The method of claim 1, wherein the first lever and first jaw are moveable on a general axis toward and away from the second jaw and second lever.

3. The method of claim 1, wherein the general axis is a separate part from the jaws.

4. The method of claim 1, wherein the first jaw contains a gripping surface that secures said weed.

5. The method of claim 4, wherein the gripping surface is comprised of notches that are angled toward the general axis, that securely grip a weed for extraction.

6. The method of claim 1, wherein the first lever is covered by a lever grip and said lever grip assists the user of the device to maintain an ample grip on said first lever as said levers are moved toward and away from each other, and as device is positioned around said weed, and as said weed is extracted.

7. The method of claim 1, wherein the first lever and the lever, grip that covers said first lever are one piece.

8. The method of claim 1, wherein the debris passage in the at least one jaw allows for debris to pass through said jaw in the direction opposite the gripping surface and to exit said jaw.

* * * * *